(12) United States Patent
Petschnigg et al.

(10) Patent No.: US 8,490,047 B2
(45) Date of Patent: Jul. 16, 2013

(54) GRAPHICAL MASHUP

(75) Inventors: Georg F. Petschnigg, Seattle, WA (US); Jonathan R. Harris, Redmond, WA (US); Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 12/354,653

(22) Filed: Jan. 15, 2009

(65) Prior Publication Data

US 2010/0180254 A1 Jul. 15, 2010

(51) Int. Cl.
G06F 9/44 (2006.01)

(52) U.S. Cl.
USPC ............ 717/105; 715/765; 715/822; 717/108

(58) Field of Classification Search
USPC ......................................................... 717/105
See application file for complete search history.

(56) References Cited

U.S. PATENT DOCUMENTS

| | | | |
|---|---|---|---|
| 2004/0044987 A1* | 3/2004 | Kompalli et al. | 717/100 |
| 2008/0051989 A1 | 2/2008 | Welsh | |
| 2008/0065580 A1 | 3/2008 | Spence et al. | |
| 2008/0109761 A1 | 5/2008 | Stambaugh | |
| 2008/0222599 A1 | 9/2008 | Nathan et al. | |
| 2009/0313601 A1* | 12/2009 | Baird et al. | 717/106 |

FOREIGN PATENT DOCUMENTS

EP 1936585 A1 6/2008

OTHER PUBLICATIONS

Brodt, Andreas, "Location-based Mashups for Nokia Internet Tablets", retrieved at <<ftp://ftp.informatik.uni-stuttgart.de/pub/library/medoc.ustuttgart_fi/DIP-2579/DIP-2579.pdf>>, Aug. 7, 2007, pp. 92.
"Zapthink Zapnote", retrieved at <<http://www.idvsolutions.com/documents/IDVSolutions-ZapNote.pdf>>, Mar. 2008, pp. 7.
Brandt, et al., "Lash-Ups: A Toolkit for Location-Aware Mash-Ups", retrieved at <<http://hci.stanford.edu/lash-ups/brandt_lash-ups_uist_2006_short_paper.pdf>>, pp. 2.
"An Introduction to Mashups", retrieved at <<http://d.scribd.com/docs/qqi24un1eal6avqsdhy.pdf>>, Supporting Digital Library Development Programmes, Oct. 2007, pp. 2.
"Pipes Adds Interactive Yahoo! Maps, KML Support (and More)", retrieved at <<http://blog.pipes.yahoo.net/2007/05/02/pipes-adds-interactive-yahoo-maps-kml-support-and-more/>>, Oct. 20, 2008, pp. 1.

* cited by examiner

*Primary Examiner* — Don Wong
*Assistant Examiner* — Deric Ortiz
(74) *Attorney, Agent, or Firm* — Wolfe-SBMC

(57) ABSTRACT

This document describes various techniques for creating, modifying, and using graphical mashups. In one embodiment, a graphical mashup is created based on locations of graphical representations of objects in a working area. Logical connections between the objects are created based on the objects' locations relative to each other. Alternatively or additionally, the techniques may enable a user to create or modify a graphical mashup by adding or deleting objects, modifying logical connections between objects, annotating objects, or abstracting the graphical mashup.

20 Claims, 8 Drawing Sheets

GRAPHICAL MASHUP

BACKGROUND

A mashup is an integration of information from multiple sources, such as web services. For example, cartographic information from a mapping web service can be combined with real estate information to create a web-based mashup that provides directions and location information for homes that are for sale.

Creating and modifying mashups, however, can be difficult. To create or modify a mashup a software developer often has to be involved and skilled in asynchronous programming, data structures, and various programming languages. This limits the widespread use of mashups.

SUMMARY

This document describes various techniques for creating, modifying, and using graphical mashups. In one embodiment, a graphical mashup is created based on locations of graphical representations of objects in a working area. Logical connections between the objects are created based on the objects' locations relative to each other. Alternatively or additionally, the techniques may enable a user to create or modify a graphical mashup by adding or deleting objects, modifying logical connections between objects, annotating objects, or abstracting the graphical mashup.

This Summary is provided to introduce a selection of concepts in simplified form that are described below in the Detailed Description. This Summary is not intended to identify key or essential features of the claimed subject matter, nor is it intended to limit the scope of the claimed subject matter. The term "object," for example, may refer to content from an Internet website, created by a user, acquired from a third party, or any other as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and figures may indicate similar or identical items.

DETAILED DESCRIPTION

Overview

The techniques described in this document enable computer users to quickly and easily create, modify, and use graphical mashups.

In one embodiment, a graphical interface contains left and right pages. The left page presents objects that can be used to create and modify graphical mashups, and the right page provides a working area in which graphical mashups can be created, modified, and utilized.

In an additional embodiment, a user can create graphical mashups by transferring objects to the working area. The user then creates one or more logical connections between the objects by placing the objects proximate one another, or alternatively by creating the logical connections graphically. The graphical mashup can then be modified by adding or deleting objects, adding or deleting logical connections, annotating the mashup, or abstracting the mashup.

In a further embodiment, a graphical mashup can be searched or analyzed to determine something about the graphical mashup's objects, logical connections, or relationships. For example, a user may input search criteria into a searching utility that searches the individual objects, the logical connections between objects, the structure of the graphical mashup, and/or the relationships between graphical mashups. The searching utility then presents the search results to the user. Searching can be performed for an entire working area, individual graphical mashups, or portions of a graphical mashup.

In the discussion that follows, an example computing environment is described in which the various techniques may be employed. Then a graphical user interface is described, which may be used to create, modify, and search graphical mashups. Last, example procedures are described that may be employed in the example computing environment to create, modify, and search graphical mashups. It should be readily apparent that these techniques may be employed within a variety of computing environments without departing from the scope or spirit of the disclosure.

Example Computing Environment

Figure 1:
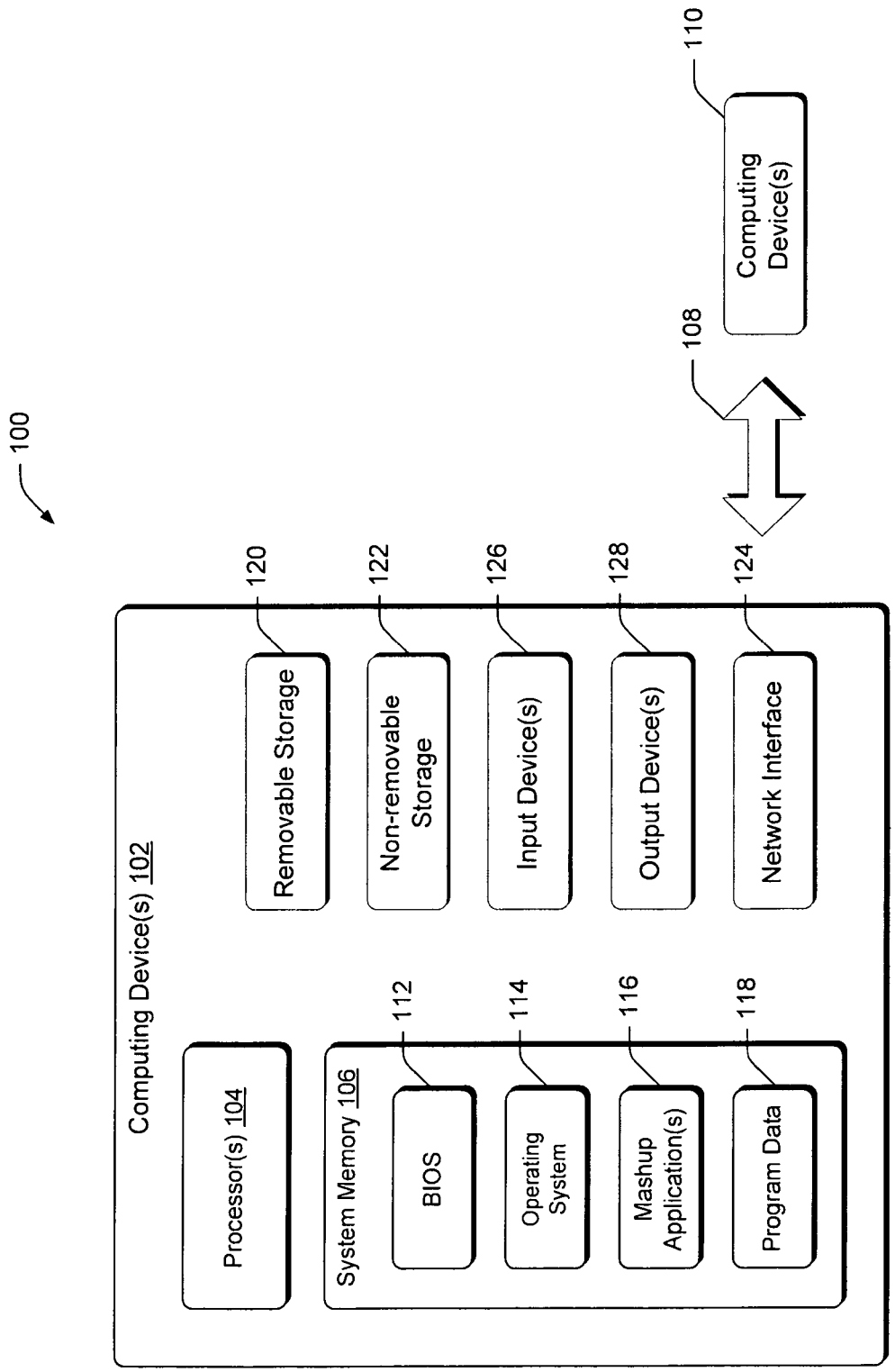
FIG. 1 illustrates a computing environment in which the techniques may be employed in accordance with an example embodiment.

FIG. 1 illustrates a computing environment 100 in an example embodiment in which the described techniques may be employed. The computing environment 100 includes one or more computing device(s) 102, including one or more processor(s) 104, system memory 106, and a bus (not shown) that communicatively couples the various components together. The computing device 102 may be communicatively coupled through a network connection 108 to one or more remote computing device(s) 110. Although a single network connection 108 is shown, the network connection 108 may represent network connections achieved using a single or multiple networks. For example, network connection 108 may represent a cellular phone network, an Internet Protocol (IP) network, or any other network or group of networks.

Computing device 102 may be configured in a variety of ways. For example, the computing device 102 may be configured as a personal computer, a server, a handheld computing device, a laptop computer, or any other networked computing device. In the following discussion, the computing device 102 may represent one or more entities and therefore reference may be made to a single entity (e.g., computing device 102) or multiple entities (e.g., computing devices 102).

The computing device 102 includes system memory 106, which includes volatile memory (such as RAM), non-volatile memory (such as ROM), or a combination of the two. A number of program modules may be stored in system memory 106, including a basic input/output system (BIOS) 112, an operating system 114, one or more graphical mashup applications 116, and program data 118.

Additionally, the computing device 102 may include computer-readable storage media, such as removable 120 and non-removable 122 storage media, including, but not limited to, magnetic storage, optical storage, or tape storage. Computer storage media includes media implemented in any method or technology for storing information such as computer-readable instructions, data structures, program modules, and the like.

Computing device 102 typically operates in a networked environment using one or more network interfaces 124 to communicate with one or more remote computing devices, such as remote computing device(s) 110. The remote computing device(s) 110 may be a personal computer, a server, a router, a network PC, or other networked computing device. The network connections 108 may include a local area network (LAN) and/or a wide area network (WAN). These networking environments are common in offices, company intranets, enterprise computing networks, and the Internet. It should be appreciated that the network connections are illustrative, and other means of establishing communications between computing devices may be used.

The computing device 102 may also include input device(s) 126 such as a keyboard, a pointing device (e.g., mouse), voice input device (e.g., microphone), touch input device, and the like. The computing device may also include output devices 128 such as a display device, speakers, and printers. These devices are well known in the art and accordingly are not discussed at length.

Note that one or more of the entities shown in FIG. 1 may be further divided, combined, and so on. Thus the computing environment 100 of FIG. 1 is illustrative of one of a plurality of different computing environments that may employ the described techniques.

Generally, any of the techniques described herein can be implemented using software, firmware, hardware (e.g., fixed-logic circuitry), manual processing, or a combination thereof. Moreover, the techniques are platform-independent, meaning that they may be implemented on a variety of computing platforms having a variety of processors.

User Interface

The following discussion describes a user interface (UI) in which graphical mashups may be created, modified, and utilized. Aspects of these techniques may be implemented in hardware, firmware, or software, or a combination thereof.

Figure 2:
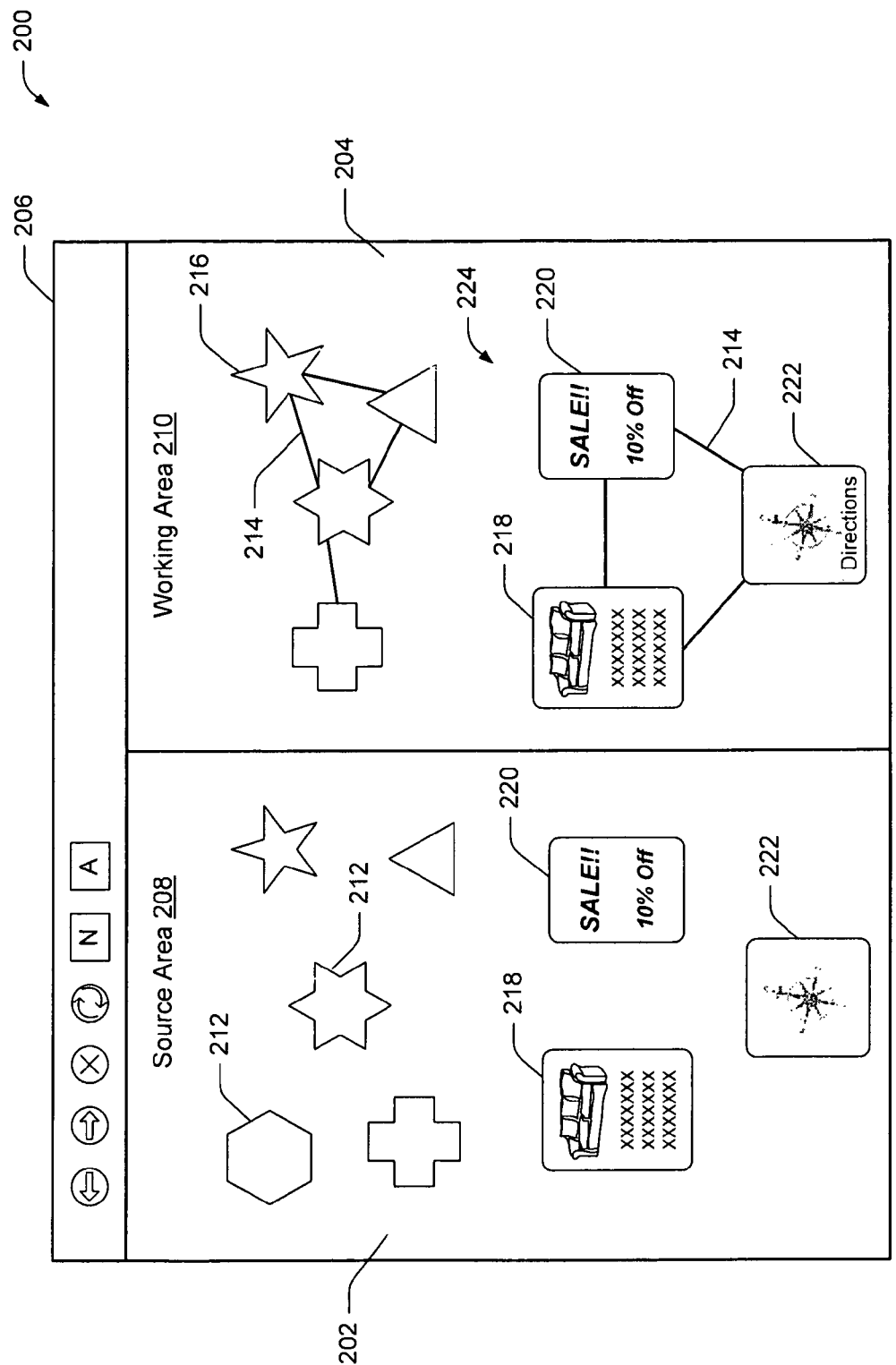
FIG. 2 illustrates an example graphical user interface in which graphical mashups may be created, modified, and searched in accordance with one or more example embodiments.

FIG. 2 depicts an illustrative user interface (UI) 200 in which graphical mashups can be created, modified, and employed. It will be appreciated that other UI's can be employed to implement the techniques described herein, and the illustrated UI is but one way of implementing the described techniques.

In the illustrated example, UI 200 is depicted as a digital notebook containing a left page 202, a right page 204, and a navigation bar 206. The left page 202 includes a source area 208, which presents various digital objects 212 that can be used to create graphical mashups (e.g., images, documents, videos, web services, web sites, email messages, and RSS feeds, to name a few). The right page 204 includes a working area 210 in which graphical mashups can be created, modified, and utilized.

The user can select one or more objects 212 from the source area 208 and transfer them to the working area 210. The user can then establish one or more logical connections 214 between the objects 212 by placing them adjacent or proximate one another. Alternatively the user can create the logical connections 214 graphically with a pointing device or other input device. The end result is a graphical mashup 216 comprising various objects 212 that are interconnected with one or more logical connections 214.

In one embodiment, an application, such as mashup application 116, creates the logical connections 214 between objects by connecting or linking the objects together such that they cannot be moved, modified, or deleted without affecting the other objects comprising the graphical mashup. The logical connections can be created, for example, using object linking and embedding techniques.

In an alternate embodiment, an application employs a wrapper creation process to convert an object's output (e.g., web service or web site) into a wrapper written in JavaScript or other dynamic language. The wrapper then provides the interface on top of the web service to abstract the underlying application so that the user can interact with the wrapper rather than the underlying application. This allows the user to graphically connect the inputs and outputs of the web services and/or web sites together to form a graphical mashup.

Consider a user that wants to purchase a new couch. To get a perspective of the various styles of couches for sale, the user searches the Internet and finds a couch that he likes at a local furniture store. As it turns out, the furniture store is having an inventory reduction sale and customers receive 10% off the price if they have a store coupon. Accordingly, the user downloads a picture and description of the couch 218 along with a store coupon 220. If the user has not been to the store, he will likely go to an online mapping service and download directions to the store 222. Typically, the user will print the description 218, coupon 220, and directions 222 on separate pieces of paper and save them for later use. Alternatively, the user might download the description 218, coupon 220, and directions 222 to a personal digital assistant (PDA), laptop computer, or other computing device for later use. One problem with these options is that the paper or data files can easily become lost or misplaced.

Since the objects in a graphical mashup are connected and interrelated, they are unlikely to be lost or misplaced like hard copy or individual data files. In the illustrative example, the user downloads the description 218, coupon 220, and the directions 222 to the source area 208. The user then, individually or collectively, selects the description 218, coupon 220, and directions 222, and transfers them to the working area 210. This can be performed by dragging and dropping the objects, cutting and pasting the objects, or any other methods or techniques for transferring digital objects, including downloading them directly to the working area 210. The user then places the objects (218, 220, and 222) proximate one another after which the software application creates logical connections 214 between the objects (e.g., by graphical mashup application 116). The objects are "proximate one another" when they are adjacent to one another, overlap one another, or are in the same general area of the working area 210. Once the logical connections are created, the "couch graphical mashup" 224 is complete. Since the description 218, coupon 220, and directions 222 objects are interconnected, they are not easily lost or misplaced, are easily accessible, and collectively contain more information than the individual objects.

In addition, the individual objects can be updated when its source (e.g., web page, web application, web service, to name a few) is updated or changed. For example, if the user encounters a traffic accident while driving to the furniture store, they can calculate an alternate route by updating the directions object 222. This can be performed by selecting the directions object 222 and uploading the user's current location to the online mapping service. The online mapping service recalculates the user's route and downloads new directions. Accordingly, not only does the couch graphical mashup 224 present information that can be used to purchase a couch, but it can also be dynamically updated to reflect user-initiated changes (e.g., download new directions) or changes initiated by an object's source (e.g., furniture store website, online mapping service).

Alternatively, there may be situations when a user wants to manually create one or more logical connections between objects. For example, the user may want to create the logical connections manually when modifying an existing graphical mashup, connecting specific mashup objects together, or creating custom logical connections (e.g., greater or lesser affinity between objects).

Figure 4:
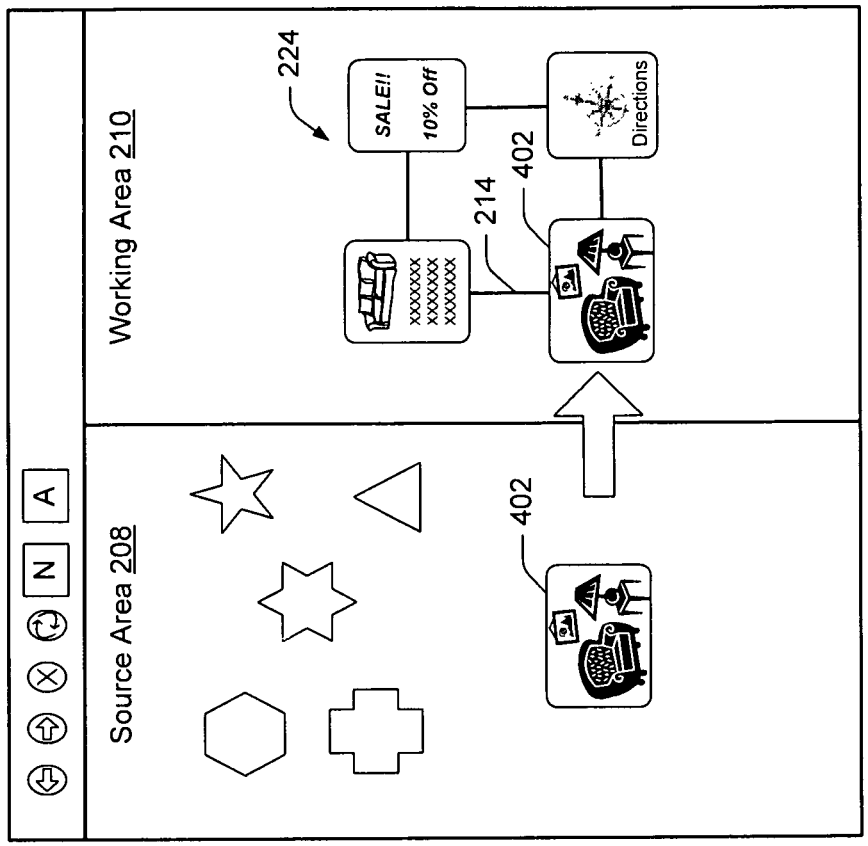
FIGS. 3 and 4 illustrate graphical mashups being created in accordance with one or more example embodiments.
Figure 3:
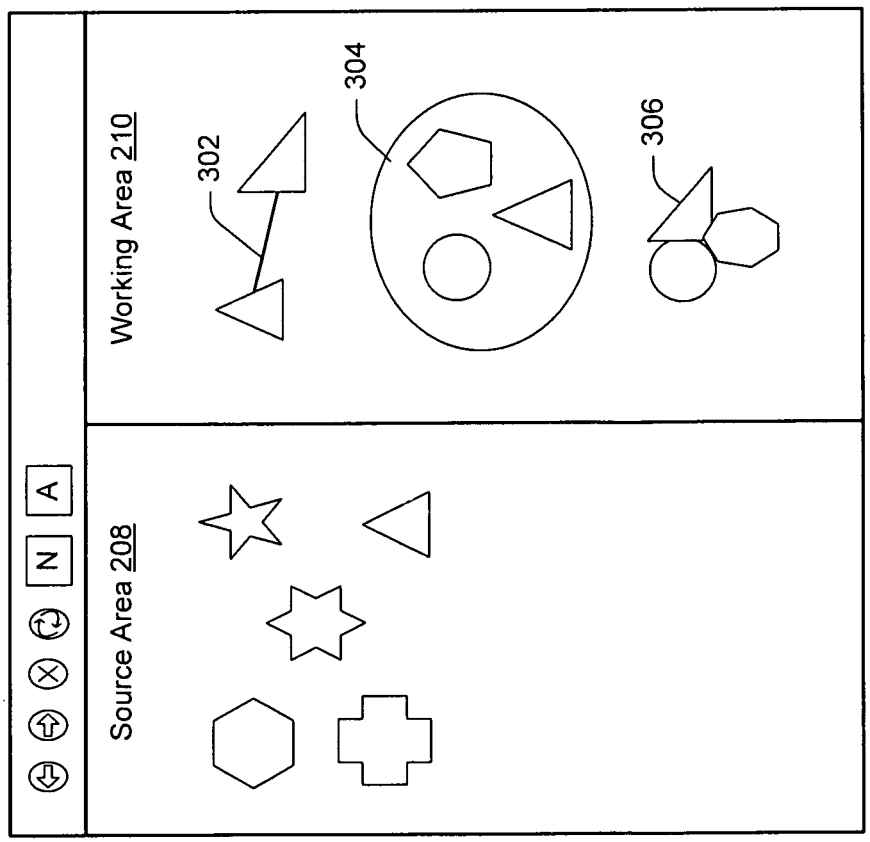

Referring to FIG. 3, the user may use a pointing device, such as a mouse to draw logical connections between objects 302, draw circles around objects 304, touch objects together 306, or any other means of graphically creating logical connections between objects. In the couch example, the user may want to include a picture of his living room to ensure that the couch fits his décor. Referring to FIG. 4, the user downloads a picture of his living room 402 from his digital camera to the source area 208, transfers the picture to the working area 210, and draws logical connections 214 from the living room object 402 to the couch graphical mashup 224. That way, the user will have a picture of his living room when selecting the color, style, and size of the couch.

Once a graphical mashup has been created, there may be situations when a user may want to modify or change it. In a further embodiment, a graphical mashup can be modified by adding or deleting objects, adding or deleting logical connections, annotating the mashup, or abstracting the mashup.

Figure 5:
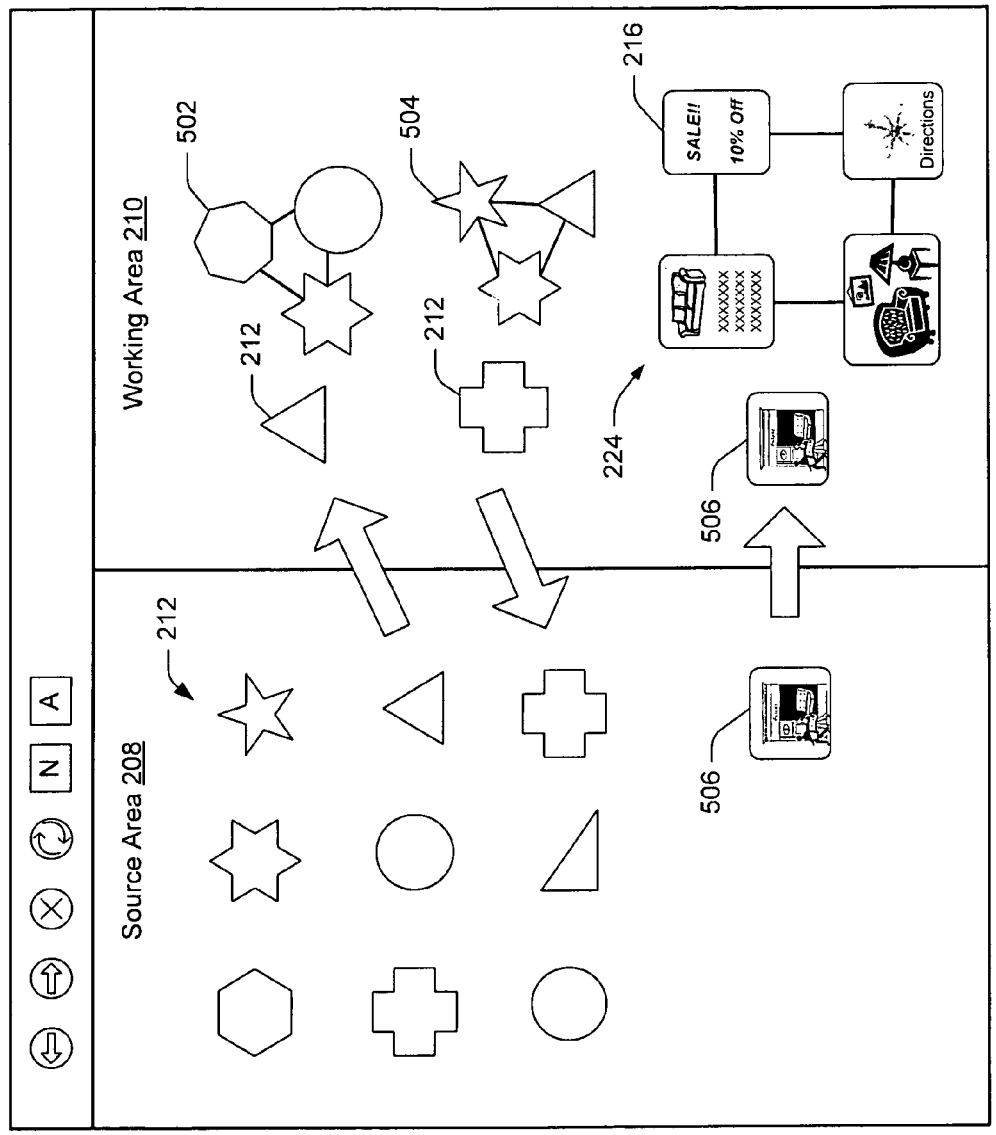
FIG. 5 illustrates graphical mashups being modified in accordance with one or more example embodiments.

FIG. 5 illustrates a technique for modifying graphical mashups in accordance with one or more embodiments. As discussed, digital objects 212 may be downloaded from the Internet, created by the user (e.g., picture, document), acquired from others (e.g., friends and family members), among others, and placed in the source area 208 in preparation for creating one or more graphical mashups. The user can transfer one or more of the objects 212 from the source area 208 to the working area 210, and place them proximate an existing graphical mashup 502. By placing object(s) 212 proximate an existing graphical mashup 502 a mashup application, such as mashup application 116, combines the object(s) 212 with the graphical mashup 502 to create a modified graphical mashup. Alternatively, a graphical mashup can be modified by removing an object. For example, the user can remove or delete one or more object(s) 212 from the graphical mashup 504 and a mashup application reconfigures the graphical mashup's logical connections.

To illustrate this, assume that the example purchaser wants to comparison shop but is unsure as to which couch he wants to purchase. He might want to add a discount retailer's website to his couch graphical mashup. Accordingly, the purchaser can download a link to the discount retailer's website 506 to the source area 208, transfer it to the working area 210, and incorporate it into his couch graphical mashup 224 by placing it adjacent to the graphical mashup. The mashup application can then create one or more logical connection(s) between the discount-retailer's object 506 and the couch graphical mashup 224. That way, once the purchaser has determined which couch to purchase, he can quickly and easily comparison shop using the discount retailer's website.

Graphical mashups can also be modified by removing or deleting mashup objects. If, for example, the user's coupon 216 expires, the user may want to modify the couch graphical mashup 224 by removing the coupon object 216. Specifically, the user can drag away the coupon object 216, delete the coupon object 216, or delete the logical connections between the coupon object 216 and the couch graphical mashup 224. Once the coupon object 216 has been removed or deleted the mashup application reconfigures the couch graphical mashup 224 by revising its logical connections.

Figure 6:
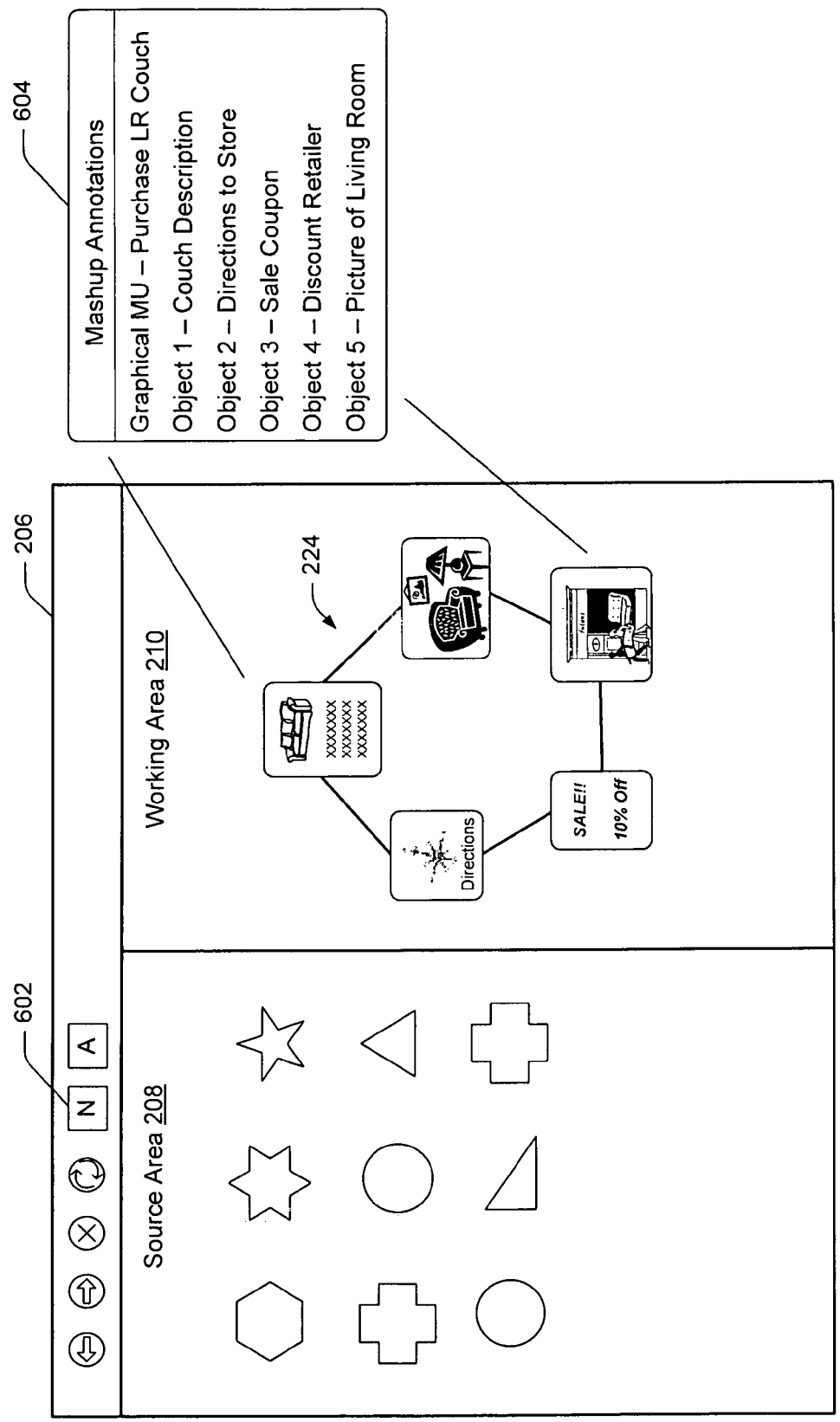
FIG. 6 illustrates a graphical mashup annotated in accordance with an example embodiment.

Graphical mashups can also be modified through annotation. For example, a user may want to annotate a graphical mashup, its objects, its logical connections, or add notes or thoughts to the working area adjacent the graphical mashup. FIG. 6 illustrates a technique for annotating graphical mashups in accordance with one or more embodiments. Using the couch example, the user may want to annotate the couch graphical mashup 224, along with the objects and logical connections that make up the graphical mashup. Alternatively, the user may want to annotate the area surrounding the couch graphical mashup 224 with his thoughts and ideas, or any other information that he wants to record.

In one embodiment, the user goes to the digital notebook's tool bar 206 and selects an annotation icon 602. The user then selects the graphical mashups that he wants to annotate (e.g., couch graphical mashup 224) and/or the areas that he wants to annotate (e.g., area surrounding a graphical mashup, an object, or a logical connection). Then a window 604 opens to receive the user's annotations. In the illustrative example, the user titles the graphical mashup "Purchase Living Room Couch," and annotates each of the mashup objects (i.e., Objects 1-5) with the subject or source of the object. In an alternate embodiment, the user selects the annotation icon 602 and a window 604 opens to receive the user's annotations. The user inputs his annotations, and then drags and drops the window 604 over the couch graphical mashup 224 or an area adjacent the couch graphical mashup 224.

One issue with graphical mashups is that as they grow in size and complexity they can become cumbersome to use and work with. One solution is to abstract graphical mashups by reducing its level of detail, thereby enabling users to work with them at a higher level. One can conceptualize different levels or representation of the information. Specifically, graphical mashups can be abstracted to factor out unnecessary details (e.g., objects, logical connections, annotations, among others), leaving higher level representations of the graphical mashups. This in turn simplifies the user interface by removing unnecessary detail, eliminating clutter, and freeing up needed working area space.

Figure 8:
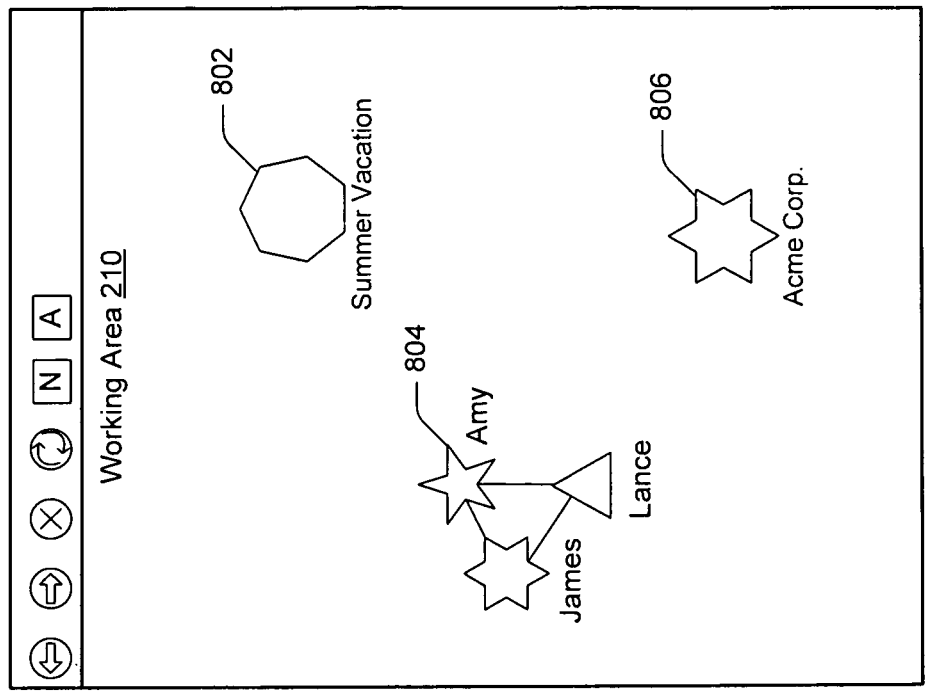
FIGS. 7 and 8 illustrate graphical mashups being abstracted in accordance with one or more example embodiments.
Figure 7:
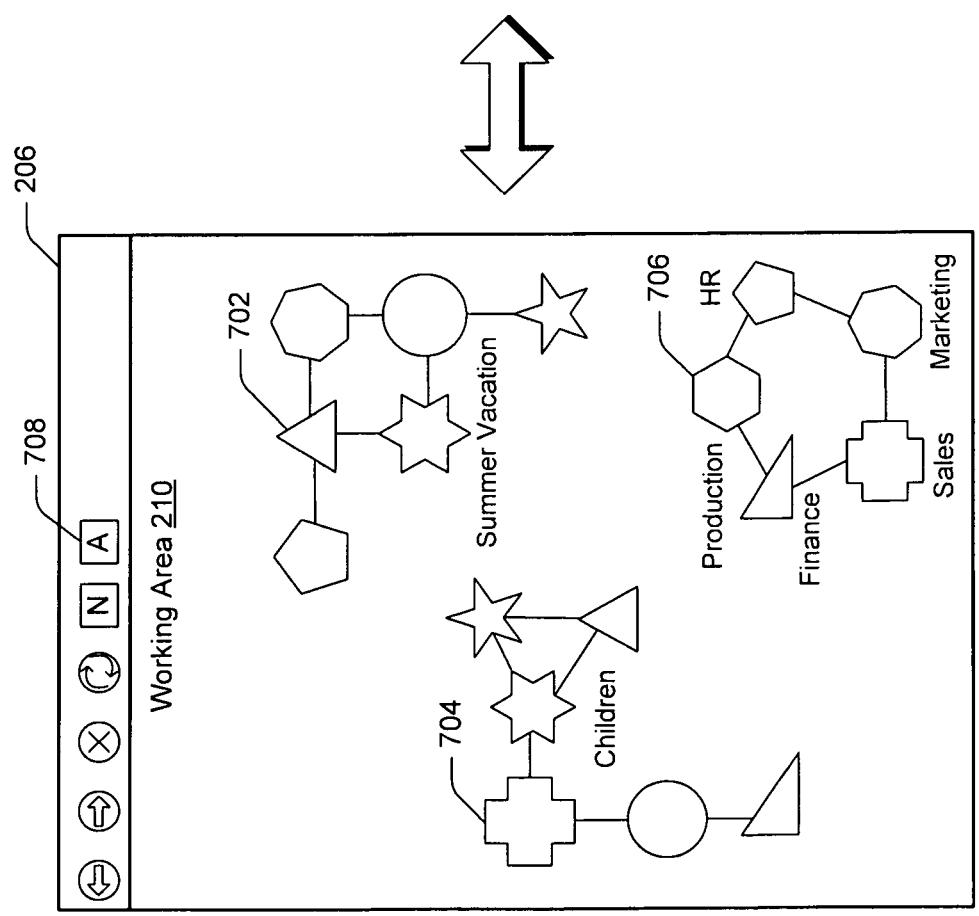

FIG. 7 illustrates a technique for abstracting graphical mashups in accordance with one or more embodiments. Working area 210 contains three graphical mashups: the first graphical mashup 702 is associated with the user's summer vacation; the second graphical mashup 704 is associated with user's children; and the third graphical mashup 706 is associated with the user's business. Since the three graphical mashups take up a large portion of the working area 210, the user may decide to abstract each of them. By way of example, the user may select one or more of the graphical mashups (702, 704, and 706) and the abstraction icon 708. Then, a mashup application, such as mashup application 116, abstracts and displays the abstracted graphical mashups. Referring to FIG. 8, the first graphical mashup 702 is represented as a single mashup object 802 (e.g., summer vacation), the second mashup object 604 is represented as a group of mashup objects 804 (e.g., individual children James, Lance, and Amy), and the third graphical mashup 606 is represented as a new mashup object 806 comprising one or more existing objects (e.g., human resources, marketing, sales, finance, and production). By employing abstraction the user interface is simplified and the working area 210 is less cluttered.

Once a graphical mashup has been created, the next step is generally to use the assembled information. In a further embodiment, a user searches a graphical mashup to determine something contained in the graphical mashup (e.g., information contained in the objects), something about its structure (e.g., logical connections, relationships between the objects), or something about the graphical mashups relationships with other graphical mashups.

By way of example, a user wants to contact a person that attended last year's holiday party, but the only thing that he remembered was that the person's first name was "Lydia." The user goes to a graphical mashup searching utility, such as mashup application 116, and inputs "Lydia" and "holiday party graphical mashup." The searching utility searches the graphical mashup's objects (e.g., attendance list, email messages, annotated holiday pictures), logical connections (e.g., attendance list and emails of people that confirmed they were coming), and relationships with other graphical mashups (e.g., summer party, ski trip, other social events) that are associated with the "holiday party mashup" and "Lydia." The searching utility employs any of the known searching techniques, such as, for example, an informed search, a list search, a tree search, or a graph search, to name a few. The searching utility then presents the search results to the user via any number of presentation techniques including, but not limited to: highlighting the relevant portions of the graphical mashup; listing the relevant mashup objects and connections; highlighting the relevant portions of text; or any other suitable means of presenting search results. In this example, the utility highlights all the references to "Lydia" in the holiday party graphical mashup.

Note that searches using a graphical mashup can be repeated if they are unsuccessful or the search criterion turns out to be incorrect. For example, if after performing the search the user discovered that "Lydia" was actually named "Olivia," he can repeat the search with the correct search criteria. Alternatively, the user can revise the search criteria by modifying the graphical mashup itself. For example, the user can add or delete objects, add or delete logical connections, or establish a logical connection with another graphical mashup.

Example Procedures

The following discussion describes ways in which graphical mashups may be created and modified. Aspects of these procedures may be implemented in hardware, firmware, or a combination thereof. The procedures are shown as a set of blocks that specify operations performed by one or more software applications, software modules, or devices, and are not necessarily limited to the order shown for performing the operations. In portions of the following discussion, reference may be made to computing environment 100 displayed in FIG. 1.

Figure 9:
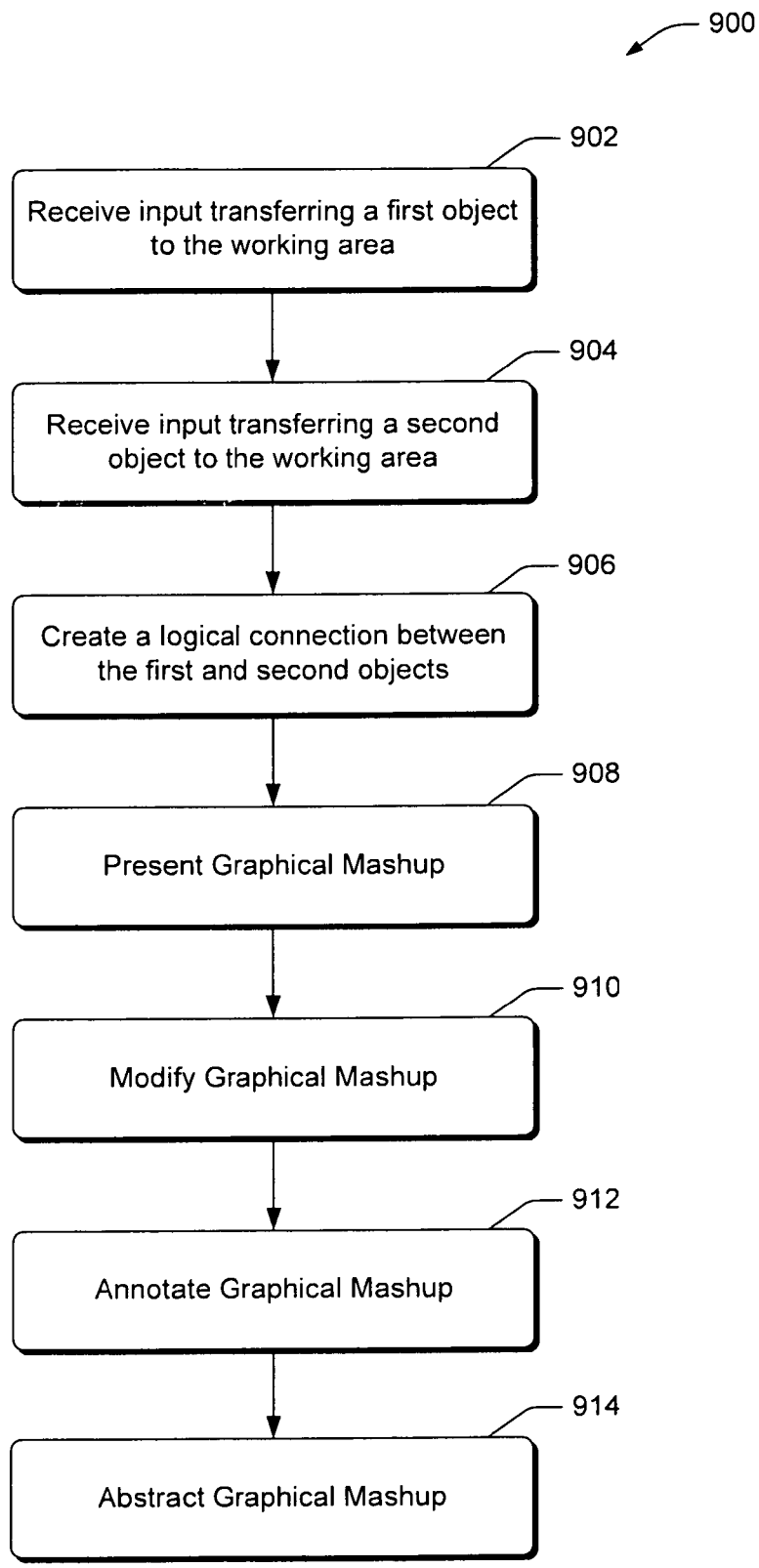
FIG. 9 is flow diagram depicting a process for creating and modifying a graphical mashup in accordance with an example embodiment.

FIG. 9 depicts a procedure 900 in an example embodiment in which a user can create and modify graphical mashups. This procedure may begin with an application, such as mashup application 116, receiving a user input transferring a first mashup object from a source area to a working area, at block 902. The user can transfer the first object by dragging and dropping it in the working area, or alternatively copying and pasting the object to the working area.

At block 904, the application receives a second user input transferring a second object to the working area and placing it proximate the first object. Alternatively, the application may receive information indicating that the user placed the second object on top of the first object, or in the same general region of the working area as the first object.

At block 906, the application creates one or more logical connections between the objects. The logical connections can be created in response to the user placing the second object proximate the first object, or the user graphically creating the logical connections. Thus, the user may employ a pointing device (e.g., mouse) to draw the logical connection between the objects, draw a circle around the objects, or touch the objects together. Once all the objects have been transferred to the working area and logical connections established the graphical mashup is presented to the user at block 908.

Once the graphical mashup is created, it may be modified in response to one or more user inputs. At block 910, the mashup application receives one or more user inputs modifying the graphical mashup and modifies the graphical mashup in response to the user's inputs. For example, the user input can add or delete objects, add or delete logical connections, or establish logical connections with other graphical mashups.

A user may also want to annotate the graphical mashup with his thoughts and ideas, recommendations, comments, or any other information that he wants to record. At block 912 the mashup application receives user input indicating that he wants to annotate a graphical mashup. In response to the user input, the application opens a window, receives the user's input, and annotates the selected graphical mashup. In an alternate embodiment, the application opens a window, receives the user inputs, and the user drags and drops the window over the graphical mashup to be annotated. The mashup application then annotates the graphical mashup with the user's thoughts and comments. The mashup application allows the user to annotate individual objects (e.g., couch, directions, coupon), logical connections (e.g., coupon for couch), the graphical mashup itself (e.g., purchase living room couch), or the working area surrounding a graphical mashup.

A user may decide to abstract a graphical mashups, such as when the graphical mashup is complex or the working area cluttered. At block 914, a mashup application receives one or more user inputs instructing a mashup application to abstract the graphical mashup. The mashup application abstracts the graphical mashup by reducing its level of detail so that the user can interact and work with the graphical mashup at a higher level. For example, a user selects an abstraction icon and one or more graphical mashups. The mashup application abstracts and displays the graphical mashup as a single object. Alternatively, the application can display the mashup as a group of objects, or as a new mashup object consisting of existing objects. By abstracting graphical mashups the UI is simplified, the working area is less cluttered, and the objects can be arranged in an organized manner.

Once a graphical mashup is created and modified, generally the next step is to use the mashup. The following discussion describes ways in which a graphical mashup may be used.

Figure 10:
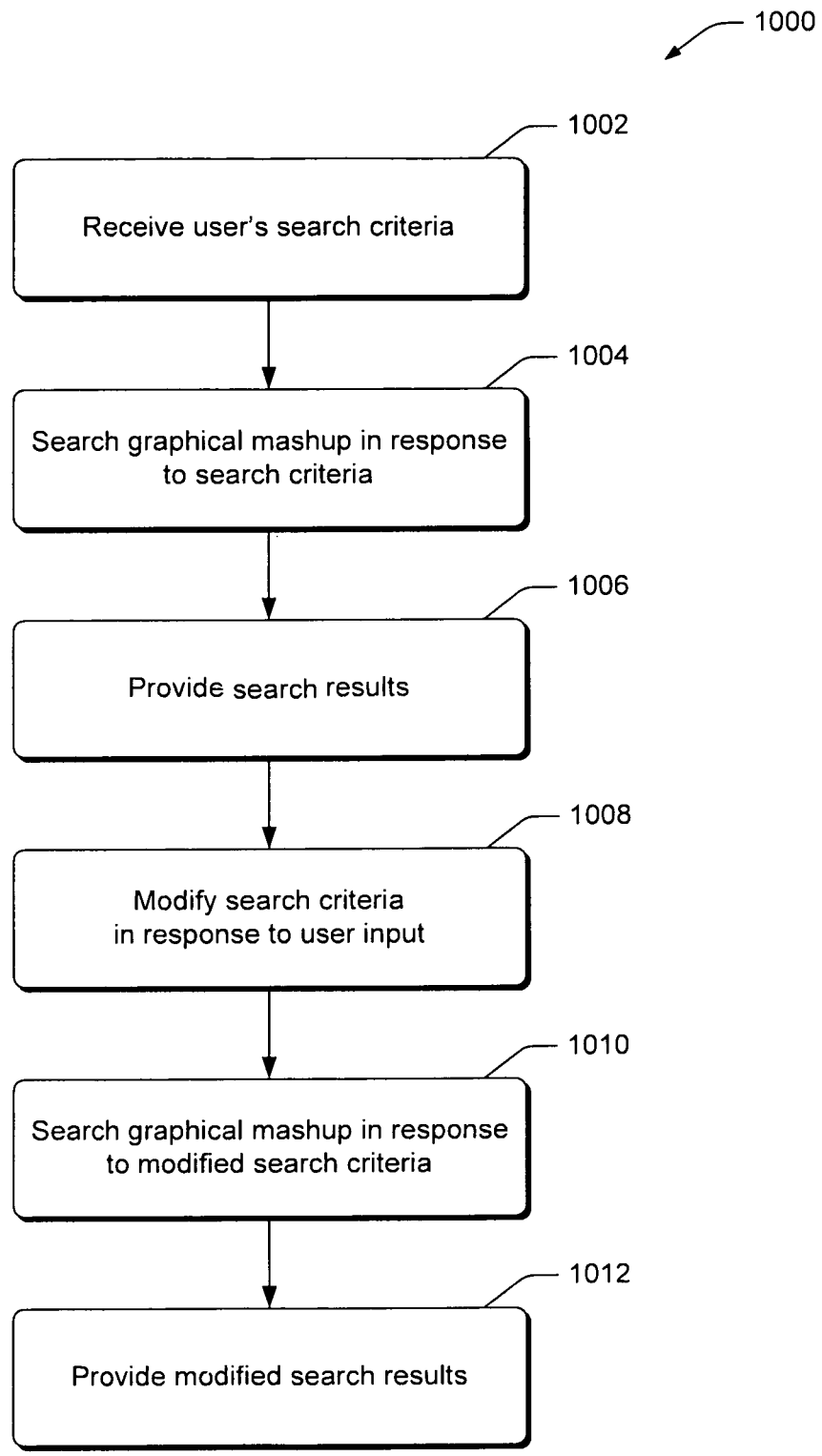
FIG. 10 is flow diagram depicting a process for searching a graphical mashup in accordance with an example embodiment.

FIG. 10 depicts a procedure 1000 in which graphical mashups can be used. This procedure shows one example use, that of searching a graphical mashup. The user may begin by providing search criteria to a graphical mashup searching utility, such as mashup application 116, illustrated in FIG. 1. At block 1002, the searching utility receives the search criteria. The search criteria can determine something about the objects and logical connections making up the graphical mashup, the graphical mashup itself, or the graphical mashups relationships with other graphical mashups. In addition, the search criteria can specify that only a portion of a graphical mashup is to be searched (e.g., specific objects and logical connections).

At block 1004, the utility searches one or more graphical mashups in response to the search criteria. The searching can be performed with any of known searching technique including, for example, an informed search, a list search, a tree search, or a graph search, to name a few.

At block 1006, the searching utility provides the search results to the user by highlighting the relevant portions of the graphical mashup. Alternatively, the searching utility can list the relevant mashup objects and logical connections, point to the relevant portions of the graphical mashup, or any other suitable means of presenting the search results.

If the search is unproductive or the search criterion is found to be in error, the user can perform additional searches using new or revised search criteria. At block 1008, the searching utility modifies the search criteria in response to the user imputing new or revised search criteria, selecting a new graphical mashup to search, selecting a portion of the graphical mashup to search, or modifying the graphical mashup (e.g., add or delete objects, add or delete logical connections, create logical connections with other graphical mashups). For example, the user may realize that he should have searched for "Lydia" in the "church retreat graphical mashup" rather than the "holiday party graphical mashup" and modifies his search criteria accordingly.

At block 1010, the searching utility searches one or more graphical mashups in response to the modified search criteria. In our example, the searching utility searches for "Lydia" in the "church retreat graphical mashup."

At block 1012, the searching utility provides revised search results to the user, such as by highlighting the relevant portions of the church retreat graphical mashup.

CONCLUSION

Although the subject matter has been described in language specific to structural features and/or methodological acts, it is to be understood that the subject matter defined in the appended claims is not necessarily limited to the specific features or steps described. Rather, the specific features and steps are disclosed as example forms of implementing the claimed subject matter.

What is claimed is:

1. A method comprising:
receiving a user input placing a first digital object in a working area proximate to a second digital object in the working area, the first digital object having a first source including at least one of a first web page, first web application, or first web service, the second digital object having a second source including at least one of a second web page, second web application, or second web service, the second source being different from the first source;
creating at least one logical connection between the first and second digital objects in response to the first digital object being placed proximate the second digital object;
presenting the first and second digital objects having the logical connection between them as a graphical mashup; and
enabling adjustment of an affinity between the first digital object and the second digital object of the logical connection, the affinity relating to a relationship strength.

2. The method recited in claim 1, further comprising tracking revisions of the first and second sources of the first and second digital objects of the graphical mashup, and responsive to updates of the first and second sources of the first and second digital objects, updating the first digital object if the first source of the first digital object is updated or updating the second digital object if the second source of the second digital object is updated.

3. The method recited in claim 1, wherein the first and second digital objects comprise one or more of an image, a document, or an email message each of which being sourced from the Internet.

4. The method recited in claim 1, wherein the at least one logical connection is created also in response to a user input creating a graphical connection between the first and second digital objects.

5. The method recited in claim 1, further comprising annotating at least one of the first or second digital objects, the logical connection, or the graphical mashup in response to a user input.

6. The method recited in claim 1, further comprising modifying the graphical mashup in response to a user input placing a third digital object in the working area proximate the graphical mashup.

7. The method recited in claim 6, further comprising modifying the graphical mashup in response to a user input removing one of the first, second, or third digital objects from the working area.

8. The method recited in claim 1, further comprising abstracting the first digital object, the second digital object, and the logical connection to create a third digital object representing the first digital object, the second digital object, and the logical connection.

9. One or more computer-readable storage media comprising computer-executable instructions that, when executed by one or more processors, perform acts comprising:
providing a working area for displaying digital objects;
displaying a first digital object in the working area, the first digital object having a first source;
receiving user input placing a second digital object within the working area and proximate the first digital object, the second digital object having a second source;
displaying the second digital object proximate to the first digital object;
building a graphical mashup by creating a logical connection between the first digital object and the second digital object in response to receiving the user input, the logical connection being adjustable to express an affinity between the first digital object and the second digital object; and
updating the first digital object in response to a change from the second source of the second digital object; or updating the second digital object in response to a change from the first source of the first digital object.

10. The computer-readable storage media recited in claim 9, wherein the first digital object or the second digital object comprises an image, a document, an email message, content from an Internet web site, content from a web service, or content from a web application.

11. The computer-readable storage media recited in claim 9, wherein the act of creating the logical connection is based on the proximity between the first and second digital object.

12. The computer-readable storage media recited in claim 9, further comprising annotating the first or second digital object or the logical connection in response to a user input.

13. The computer-readable storage media recited in claim 9, further comprising, in response to a user input, altering the proximity between the first and second digital objects.

14. The computer-readable storage media recited in claim 13, further comprising, in response to the altered proximity between the first and second digital objects, altering the logical connection.

15. The computer-readable storage media recited in claim 9, further comprising abstracting the first and second digital objects and the logical connection to create another object representative of the first and second digital objects and the logical connection.

16. The computer-readable storage media recited in claim 9, further comprising creating a second logical connection between a third digital object and the first or second digital object in response to a user input placing the third digital object proximate to the first or second digital object.

17. The computer-readable storage media recited in claim 16, further comprising modifying the graphical mashup in response to a user input removing one of the first, second, or third digital objects.

18. A method comprising:
  receiving search criteria identifying specific digital objects or logical connections of a graphical mashup;
  limiting, to a portion of the graphical mashup relevant to the search criteria, a search of the graphical mashup for the specific digital objects or logical connections to provide results; and
  providing the results of the search by highlighting the specific digital objects or logical connections found in the portion of the graphical mashup searched.

19. The method recited in claim 18 further comprising, re-searching the portion of the graphical mashup or searching another portion of the graphical mashup in response to a user modifying the search criteria.

20. The method recited in claim 18, further comprising, prior to the act of receiving search criteria, creating the graphical mashup in response to receiving user input placing a first digital object in a working area proximate to a second digital object in the working area.

\* \* \* \* \*